A. O. M. LÖFGREN.
DEVICE FOR GUIDING, SUPPORTING, AND CARRYING AN APPARATUS FOR FELLING OF TREES, CUTTING OF TRUNKS, AND THE LIKE.
APPLICATION FILED JUNE 30, 1921.
1,410,198.
Patented Mar. 21, 1922.
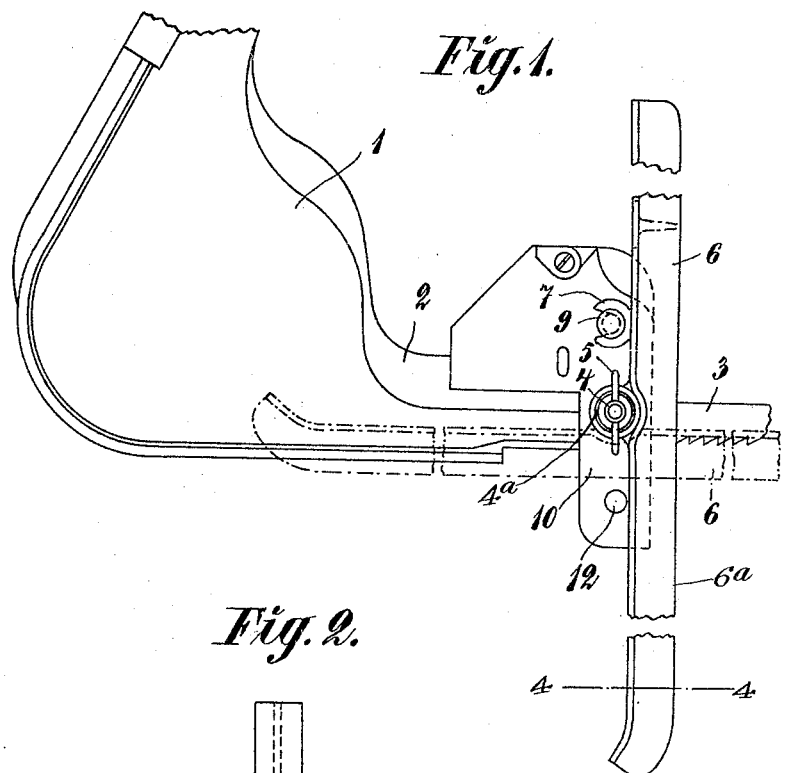
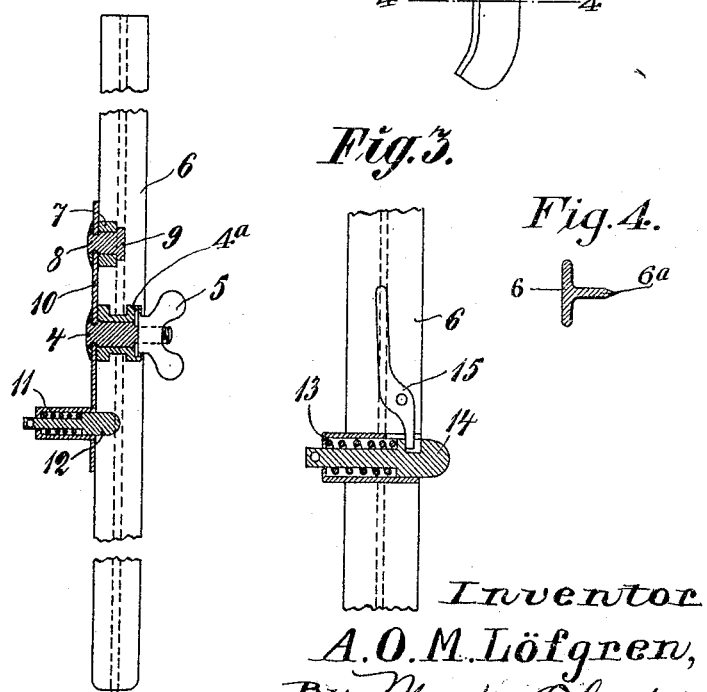
Inventor
A. O. M. Löfgren,
By Marks & Clerk
Attys.

UNITED STATES PATENT OFFICE.

ALBERT OLOF MELCHER LÖFGREN, OF STOCKHOLM, SWEDEN, ASSIGNOR TO ARVID GUSTAF MICHAEL HERNMARCK, OF DJURSHOLM, SWEDEN, AND OSCAR ROBERT GRONKWIST, OF STOCKHOLM, SWEDEN.

DEVICE FOR GUIDING, SUPPORTING, AND CARRYING AN APPARATUS FOR FELLING OF TREES, CUTTING OF TRUNKS, AND THE LIKE.

1,410,198.   Specification of Letters Patent.   Patented Mar. 21, 1922.

Application filed June 30, 1921. Serial No. 481,644.

*To all whom it may concern:*

Be it known that I, ALBERT OLOF MELCHER LÖFGREN, mechanic, a subject of the King of Sweden, and resident of Sturegatan 11, Stockholm, Sweden, have invented certain new and useful Improvements in Devices for Guiding, Supporting, and Carrying an Apparatus for Felling of Trees, Cutting of Trunks, and the like, (for which I have filed an application in Sweden Sept. 11, 1919,) of which the following is a specification, reference being made to the accompanying drawing.

This invention relates to improvements in the sawing apparatus disclosed in my Patent No. 1303809, issued May 13, 1919. In said patent I have shown means for resisting the pull of the saw blade while said blade is in use in felling or bucking a tree. The device used in felling a tree however has not proved satisfactory in practice as it is necessary to separately transport the same from tree to tree and the device must be placed in the proper position on the tree in order to perform the operation of felling. As it frequently happens that the ground at the stump is not suited for the proper support of the saw resisting means I have devised an improved device to eliminate the objections of the known device.

The primary object of the present invention is to furnish an improved device for guiding and supporting a sawing apparatus while the same is in use in felling trees, and this device is so mounted on the saw frame that it may be readily swung to an inoperative position so that it will not form an obstruction or projecting part while the sawing apparatus is being transported from one tree to another.

With the foregoing object outlined and with other objects in view which will appear as the description proceeds, the invention consists in the novel features hereinafter described in detail, illustrated in the accompanying drawing, and more particularly pointed out in the appended claims.

Referring to the drawing:

Figure 1 is a plan view of a portion of a sawing apparatus with my improved guiding and supporting device attached thereto.

Figure 2 is a sectional view of the device and a portion of the saw frame.

Figure 3 is a detail view partly in section of a modification.

Figure 4 is a sectional view of the guiding and supporting device taken on line 4—4 of Figure 1.

In the drawing, 1 designates a saw frame having an extension 2 through which travels the saw blade 3. Mounted on the extension 2 is a supporting plate 10 through which passes a pin 4 that extends through a socket 4ª on a guiding and supporting device 6, and is provided with a wing-nut 5 which is employed for pivotally and removably securing the member 6 to the saw frame. The plate 10 carries an upwardly projecting post 8 having a head 9, and this post is engaged by a fork 7 projecting from the member 6. The post 8 and fork 7 cooperate to eliminate the swinging movement of the member 6 in a counterclockwise direction about the pivot 4.

The plate 10 carries a casing or socket 11 in which is mounted a spring-pressed plunger 12 that functions to engage the back of the member 6 for preventing movement of the member 6 in a clockwise direction when the device is in operation for felling trees. By exerting force to swing the member 6 in a clockwise direction, the pin 12 will be depressed and this will permit the member 6 to swing to the dotted line position shown in Figure 1, so that it will lie in substantial alignment with the exposed portion or run of the saw-blade 3.

In moving the sawing apparatus from one tree to another, it is desirable that the member 6 occupy the position shown in dotted lines so that it will not catch on underbrush, or trees and the like. When the apparatus is to be used for felling a tree, the member 6 is swung to the position shown in full lines in Figure 1, and then the sharp edge 6ª of said member 6 will cut into the bark of the tree, so that the member 6 will function to guide and support the sawing apparatus when its is employed for felling trees.

Instead of the members 11 and 12, I may employ a manually movable plunger 14 which is pressed by a spring mounted in a casing or socket 13 carried by the member 6. The member 14 is adapted to enter a hole in plate 10 and is actuated by a hand lever 15 as shown in Figure 3.

From the foregoing I believe that the construction, operation and advantages of the invention may be readily understood by those skilled in the art, and I am aware that various changes may be made in the construction illustrated without departing from the spirit of the invention as expressed in the following claims.

What I claim and desire to secure by Letters-Patent is:—

1. In combination, a saw-frame, a saw blade carried thereby and having an exposed run, and a guiding member extending substantially at right angles to the exposed run of the saw blade and having a cutting edge adapted to cut into a tree and to aid in supporting the saw as the blade moves through a tree in felling the same.

2. The combination with a saw-frame, of a guiding member pivotally connected to said frame and provided with a beveled edge adapted to cut into the wood being sawed, and means for locking said member in a fixed position on said frame.

3. In combination, a saw-frame, a saw blade carried thereby and having an exposed run, a guide member pivotally connected to said frame and movable into positions parallel to and at right angles to the exposed run of the blade, and means for locking said guiding member in a position at right angles to the exposed run of the saw blade.

4. The combination with a saw frame, of a substantially straight guiding member pivotally connected to said frame, and means for locking said member in fixed positions at angles to each other.

5. A combination of the kind defined by claim 4 in which the locking means includes cooperating elements on said frame and member.

6. The combination with a saw frame, of a guiding member detachably and pivotally connected to said frame, and means for locking said member in fixed positions at angles to each other.

7. The combination with a saw frame, of a guiding member pivotally connected to the same, and locking means located at diametrically opposite sides of the pivot connection for fixedly securing said guiding member in a predetermined position.

8. The combination with a saw frame member, of a substantially straight guiding member pivotally connected thereto, a pin provided on one of said members, a fork provided on the other member and engageable with said pin, and means for locking said members together for holding the fork in engagement with said pin.

9. The combination with a saw frame member, of a guiding member pivotally connected to said member, and a spring-pressed plunger provided on one of said members and engageable with the other member for use in locking said guiding member in a fixed position on said frame member.

10. The combination with a saw frame member, of a substantially straight guiding member pivotally connected to said frame member and having a cutting edge, cooperating elements carried by said members and arranged at one side of the pivot connection for preventing said guiding member from swinging about the pivot in one direction beyond a predetermined point, and a releasable catch member arranged on the opposite side of said pivot connection for preventing the guiding member from swinging in the opposite direction.

In witness whereof I have hereunto set my hand in presence of two witnesses.

ALBERT OLOF MELCHER LÖFGREN.

Witnesses:
CARL TH. LUNDHOLM,
R. TOTTERMAN.